Patented May 8, 1934

1,958,209

UNITED STATES PATENT OFFICE 1,958,209

MANUFACTURE OF AMMONIUM THIOCYANATE

Norman D. Scott, Niagara Falls, N. Y., assignor to E. I. du Pont de Nemours & Company, Inc., Wilmington, Del., a corporation of Delaware No Drawing. Application June 21, 1933, Serial No. 676,929

16 Claims.  (Cl. 23—75)

This invention relates to the production of ammonium thiocyanate and thiourea, and more particularly to means whereby ammonium thiocyanate and thiourea can be produced from sulfur, ammonia and formamide.

Heretofore, the chief commercial source of ammonium thiocyanate has been from the by-products obtained in the manufacture and purification of illuminating gas. Although such by-products provide a very cheap raw material, the recovery of the ammonium thiocyanate from these complex mixtures involves serious technical difficulties and is therefore expensive. A number of processes have been proposed for the manufacture of ammonium thiocyanate synthetically, most of which depend upon the reaction of carbon disulfide with ammonia compounds or nitrites, but none of these processes appear to have been commercially successful.

Thiourea has usually been produced by heating ammonium thiocyanate in the dry state to 150° C., whereby approximately 25% of the thiocyanate is transformed to the isomeric thiourea. It also has been proposed to make thiourea directly by the reaction of cyanamide or its salts with hydrogen sulfide in the presence of ammonia.

An object of this invention is to produce ammonium thiocyanate and thiourea in an economical and efficient manner. A further object is to utilize such relatively inexpensive raw materials as sulfur, formamide, and ammonia for the production of ammonium thiocyanate and thiourea. Other objects will appear hereinafter.

I have discovered that if formamide be heated with sulfur and ammonia a mixture of ammonium thiocyanate and thiourea is formed. The reactions taking place may be represented by the following equations:

(1) $HCONH_2 + NH_3 + S \rightarrow NH_4CNS + H_2O$
(2) $HCONH_2 + NH_3 + S \rightarrow (NH_2)_2CS + H_2O$ I have further found that the velocities of these reactions are materially increased by the presence of a catalyst capable of acting as a sulfur carrier, for example, ammonium sulfide.

In carrying out the process of my invention, the reactants are brought together and heated to the reaction temperature. The reaction proceeds at a detectable rate at a temperature of 100° C. and the rate increases rapidly as the temperature rises above this point. Excessively high temperatures, however, cause decomposition of the reactants and result in diminished yields of the desired products. For this reason, I prefer not to exceed a temperature of 165° C., and generally prefer to operate within a temperature range of 120° C. to 150° C. In order to avoid loss of the volatile reactants the reaction is preferably carried out in a closed container under a pressure greater than atmospheric. It is not necessary that the total amount of reactants used be present initially in the reaction mixture. I have, for example, found it advantageous to add only a part of the ammonia to the original reaction mixture and to make further additions as the reaction proceeds. This procedure avoids the development of excessive pressure in the reaction vessel during the initial stages of the raction.

The following examples will serve to illustrate my invention:

Example I

In a strong glass tube was placed 12 grams of sulfur and 11.25 grams of formamide. The mixture was saturated with ammonia gas and then with hydrogen sulfide (to form the ammonium sulfide catalyst) and finally re-saturated with ammonia. The tube was sealed and heated at a temperature of 135° C. for 5 hours. The tube was then cooled to room temperature, opened up and re-saturated with ammonia, resealed and heated at a temperature of 135° C. for a further period of 5 hours. The mixture was again cooled and saturated with ammonia as before, and subjected to a final heating of 15 hours. On analysis of the product, the combined yield of ammonium thiocyanate and thiourea on the basis of the formamide used was found to be 77.2%, of which 84.5% was ammonium thiocyanate and 15.5% thiourea.

Example II

The following materials were used:

| | |
|---|---|
| Formamide | 450 grams (10 moles) |
| Sulfur | 350 grams (10 moles + 30 grams excess) |
| 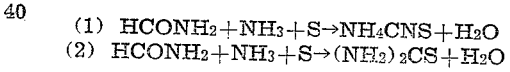 | 68 grams |
| $NH_3$ | Excess |

The sulfur and the formamide were placed in an aluminum-lined cylindrical steel bomb, 3⅛ inches in inside diameter and 30 inches long, equipped with a pressure gage and a connection for the admission of gas under pressure. The ammonium sulfide was formed in the mixture by successively passing in ammonia and hydrogen sulfide in the same manner as in Example I. The reaction mixture was then finally saturated with ammonia, the bomb sealed and mounted horizontally on a shaker carriage. The bomb was heated to a temperature of 120 to 135° C. with continuous agitation for a period of 23 hours. The initial pressure developed in the bomb under these conditions was approximately 300 pounds per square inch; this pressure was substantially maintained throughout the reaction period by periodic additions of ammonia under pressure. When the reaction was completed the product was found to contain 7.4 moles of ammonium thiocyanate and 1.25 moles of thiourea, equivalent to a combined yield of 86.5% on a basis of the formamide used.

The reaction mixtures obtained as in the above examples may be freed from ammonium sulfide by boiling for a short time, and any excess sulfur removed by filtration. Pure crystalline ammonium thiocyanate and thiourea may then be recovered separately from the solution by known methods of crystallization.

The proportion of thiourea produced in my process usually amounts to about 12% to 16% of the total thiocyanate and thiourea. If desired, however, this proportion can be increased by heating the combined salts in the dry state, to 150° C. to produce the equilibrium mixture containing approximately 25% thiourea. On the other hand, if it is desired to produce ammonium thiocyanate only, the equilibrium can be shifted to the ammonium thiocyanate side by heating in the presence of water. Thus, if sufficient water is added to the reaction mixture to form, say, a 2-molar solution, and the latter heated under pressure to 140° C. for 4 or 5 hours, the thiourea is substantially completely converted to ammonium thiocyanate.

Although my invention can be carried out merely by heating the reactants to the reaction temperature, the presence of catalytic materials causes the reaction to proceed more rapidly, and makes it possible to operate at lower temperatures, which favor minimum decomposition of the reactants. Materials which are capable of dissolving sulfur or of acting as a carrier thereof are especially suitable as catalysts,—for example, carbon disulfide and the sulfides and polysulfides of ammonium and of the alkali metals. The catalytic materials may be added as such to the reactants, or they may be formed in situ by chemical reaction as illustrated in the above examples.

I have carried out my invention in sealed bombs made of glass or of steel lined with aluminum or chromium-plated. Ordinary iron or steel equipment is subject to considerable corrosion by the reacting materials, and is therefore not preferred. The materials can be reacted in an open space or under a reflux condenser; but I prefer to operate under a pressure greater than one atmosphere, since in this way I obtain a higher rate of reaction and better yields.

Although the equations which have been given above indicate the use of equi-molar quantities of formamide, sulfur, and ammonia, I generally prefer to have the ammonia and sulfur in excess of that required to react with the formamide. This excess appears to favor the reaction, and the unreacted sulfur and ammonia may be easily recovered from the reaction mixture.

Although I have given specific examples of how to practice my invention and have illustrated what I believe to be the course of the chemical reactions concerned, my invention is not limited to the specific quantities, times or temperatures of these examples nor to any theories of the reactions.

I claim:

1. A process which comprises reacting together formamide, sulfur, and ammonia.

2. A process which comprises reacting together foramamide, sulfur, and ammonia in a closed space under a pressure above atmospheric.

3. A process which comprises reacting together formamide, sulfur, and ammonia in a closed space under a pressure above atmospheric at a temperature of 100° C. to 165° C.

4. A process which comprises reacting together formamide, sulfur, and ammonia in the presence of a catalyst.

5. A process which comprises reacting together formamide, sulfur, and ammonia in a closed space under a pressure above atmospheric in the presence of a catalyst.

6. A process which comprises reacting together formamide, sulfur, and ammonia in a closed space under a pressure above atmospheric at a temperature of 100° C. to 165° C. in the presence of a catalyst.

7. A process which comprises reacting together formamide, sulfur, and ammonia in the presence of ammonium sulfide.

8. A process which comprises reacting together formamide, sulfur, and ammonia in a closed space under a pressure above atmospheric in the presence of ammonium sulfide.

9. A press which comprises reacting together formamide, sulfur, and ammonia in a closed space under a pressure above atmospheric at a temperature of 100° C. to 165° C. in the presence of ammonium sulfide.

10. A process which comprises reacting together formamide, sulfur and ammonia in a closed space under a pressure of 200 to 500 pounds per square inch at a temperature of 120° C. to 150° C. in the presence of ammonium sulfide.

11. A process of preparing ammonium thiocyanate which comprises reacting together formamide, sulfur, and ammonia to form a mixture of ammonium thiocyanate and thiourea, and heating said mixture with water to convert the thiourea to ammonium thiocyanate.

12. A process of preparing ammonium thiocyanate which comprises reacting together formamide, sulfur, and ammonia in a closed space under a pressure above atmospheric at a temperature of 100° C. to 165° C. to form a mixture of ammonium thiocyanate and thiourea, and heating said mixture with water to convert the thiourea to ammonium thiocyanate.

13. A process of preparing ammonium thiocyanate which comprises reacting together formamide, sulfur and ammonia in the presence of a catalyst to form a mixture of ammonium thiocyanate and thiourea, and heating said mixture with water to convert the thiourea to ammonium thiocyanate.

14. A process of preparing ammonium thiocyanate which comprises reacting together formamide, sulfur and ammonia in a closed space under a pressure above atmospheric at a temperature of 100° C. to 165° C. in the presence of a catalyst to form a mixture of ammonium thiocyanate and thiourea, and heating said mixture with water to convert the thiourea to ammonium thiocyanate.

15. A process of preparing ammonium thiocyanate which comprises reacting together formamide, sulfur, and ammonia in a closed space under a pressure above atmospheric at a temperature of 100° C. to 165° C. in the presence of ammonium sulfide to form a mixture of ammonium thiocyanate and thiourea, and heating said mixture with water to convert the thiourea to ammonium thiocyanate.

16. A process of preparing ammonium thiocyanate which comprises reacting together formamide, sulfur, and ammonia in a closed space under a pressure above atmospheric at a temperature of 100° C to 165° C. in the presence of ammonium sulfide to form a mixture of ammonium thiocyanate and thiourea, and heating said mixture with water under pressure at a temperature of approximately 140° C. to convert the thiourea to ammonium thiocyanate.

NORMAN D. SCOTT.